(12) United States Patent
Mahoudeaux

(10) Patent No.: US 9,400,023 B2
(45) Date of Patent: Jul. 26, 2016

(54) DISC BRAKE PAD GUIDEWAY AND DISC BRAKE EQUIPPED WITH SUCH A GUIDEWAY

(71) Applicant: Robert Bosch GmbH, Stuttgart (DE)

(72) Inventor: Roger Mahoudeaux, Le Blanc Mesnil (FR)

(73) Assignee: Robert Bosch GmbH, Stuttgart (DE)

( * ) Notice: Subject to any disclaimer, the term of this patent is extended or adjusted under 35 U.S.C. 154(b) by 103 days.

(21) Appl. No.: 14/357,228

(22) PCT Filed: Dec. 14, 2012

(86) PCT No.: PCT/EP2012/075592
§ 371 (c)(1),
(2) Date: May 9, 2014

(87) PCT Pub. No.: WO2013/087862
PCT Pub. Date: Jun. 20, 2013

(65) Prior Publication Data
US 2014/0374202 A1 Dec. 25, 2014

(30) Foreign Application Priority Data
Dec. 15, 2011 (FR) ..................................... 11 03908

(51) Int. Cl.
*F16D 65/097* (2006.01)
*F16D 55/226* (2006.01)

(52) U.S. Cl.
CPC ........ *F16D 65/0978* (2013.01); *F16D 55/2262* (2013.01); *F16D 65/0972* (2013.01); *F16D 65/0977* (2013.01)

(58) Field of Classification Search
CPC ............ F16D 65/0972; F16D 65/0977; F16D 65/0978

USPC ..................... 188/250 E, 250 F, 250 G, 73.38
See application file for complete search history.

(56) References Cited

U.S. PATENT DOCUMENTS 4,429,769 A 2/1984 Oshima et al.
5,699,882 A * 12/1997 Ikegami .............. F16D 65/0972
188/205 A (Continued)

FOREIGN PATENT DOCUMENTS

CN 101063470 A 10/2007
JP 2009-209961 A 9/2009

(Continued)

OTHER PUBLICATIONS

International Search Report corresponding to PCT Application No. PCT/EP2012/075592, mailed Apr. 11, 2013 (French and English language document) (5 pages).

*Primary Examiner* — Thomas Irvin
(74) *Attorney, Agent, or Firm* — Maginot, Moore & Beck LLP

(57) ABSTRACT

A guideway for a motor vehicle disc brake is configured to mount at least one brake pad in a slidable manner with respect to a brake disc along an axially oriented axis of sliding. The guideway includes at least one brake pad application element which is configured to act axially. The guideway is fixed to a fixed carrier, and includes an elastically deformable leg and a guide face that has a contact zone. The elastically deformable leg is configured to exert a constant elastic force. The guide face includes a damping element. The elastically deformable leg further includes a bent-over portion configured to contact the at least one brake pad such that the guide face is opposite a contact zone of the at least one brake pad.

9 Claims, 4 Drawing Sheets

(56) References Cited

U.S. PATENT DOCUMENTS

| | | | |
|---|---|---|---|
| 6,223,866 B1 | 5/2001 | Giacomazza | |
| 6,296,085 B1* | 10/2001 | Yukoku | F16D 65/0972 188/73.36 |
| 6,427,810 B2* | 8/2002 | Schorn | F16D 65/0977 188/73.38 |
| 7,086,506 B2* | 8/2006 | Wemple | F16D 65/0977 188/73.38 |
| 7,152,717 B2* | 12/2006 | Lelievre | F16D 65/0006 188/250 E |
| 8,042,656 B2* | 10/2011 | Tsurumi | F16D 65/095 188/73.31 |
| 8,393,441 B2* | 3/2013 | Gutelius | F16D 65/0972 188/72.3 |
| 8,397,880 B2* | 3/2013 | Chelaidite | F16D 65/0972 188/73.31 |
| 2007/0251772 A1 | 11/2007 | Tsurumi | |
| 2009/0277729 A1 | 11/2009 | Kim | |
| 2010/0147635 A1* | 6/2010 | Hayashi | F16D 65/0977 188/73.38 |
| 2011/0168503 A1* | 7/2011 | Chelaidite | F16D 65/0972 188/73.31 |
| 2014/0305754 A1* | 10/2014 | Bernard | F16D 65/0972 188/250 E |
| 2014/0326548 A1* | 11/2014 | Merrien | F16D 65/0006 188/73.38 |

FOREIGN PATENT DOCUMENTS

| | | |
|---|---|---|
| WO | 01/31223 A1 | 5/2001 |
| WO | 2010/086088 A1 | 8/2010 |

* cited by examiner

DISC BRAKE PAD GUIDEWAY AND DISC BRAKE EQUIPPED WITH SUCH A GUIDEWAY

This application is a 35 U.S.C. §371 National Stage Application of PCT/EP2012/075592, filed on Dec. 14, 2012, which claims the benefit of priority to Serial No. FR 1103908, filed on Dec. 15, 2011 in France, the disclosures of which are incorporated herein by reference in their entirety.

The disclosure concerns a guideway formed by a folded metal sheet and a spring protruding from this guideway, for a disk brake for a motor vehicle, which comprises at least one brake pad mounted sliding axially in a carrier, and disk brakes equipped with such a guideway.

BACKGROUND

In a vehicle equipped with disk brakes, each wheel to be braked comprises a brake disk integral with the wheel and brake pads integral with the chassis of the vehicle, which come to brake the disk by friction. The brake comprises a caliper with a carrier with a U-shaped branch carrying a brake pad on each side of the brake disk, and each pad is movable perpendicularly to the disk plane when guided by its two ends (lugs) in housings of the arms of the carrier.

During braking, the pads are driven in a direction tangential to the disk, and the lugs come to rest—sometimes suddenly— against the base of their guide housing, causing a clonking noise. To dampen the impact of the lugs in their housing and thus attenuate the noise, a guideway is provided between each lug and its housing, and the damping is obtained by deformation of a spring formed by a leg of the guideway, the shape of which is adapted to the force exerted by the brake pad during its tangential movement.

Motor vehicle disk brakes exist which comprise at least one brake pad which is mounted sliding in relation to a brake disk along an axially oriented slide axis in at least one guideway, between a front braking position in which a friction face of the brake pad or brake block is able to be applied to a face of the disk, and a rear rest position in which the friction face of the brake pad is remote from the face of the disk. A caliper comprises at least one application element for the brake pad which is able to stress the brake pad axially towards its braking position, wherein the guideway is fixed to a fixed carrier and comprises an axially deformable leg, comprising a guide face and a contact zone with the brake pad, and exerting a constant elastic force.

It is known to propose brake disks of the type described above in which each guideway is made from a folded metal sheet which also forms a leaf spring which is fixed to the carrier of an associated caliper, these guideways thus combining a spring function. These disk brakes are quieter than conventional brakes. In fact the guideways and the leaf springs, generally made from a stainless steel sheet, are intended to reduce the vibrations existing between the brake pad and the carrier by allowing a certain freedom of movement of the brake pad in relation to the carrier, and thus allowing a reduction in the coefficient of friction between the pad and the carrier by improved surface states. The brake pads are generally mounted sliding freely in the associated guideways. Control of the coefficient of friction and the forces applied by the leaf spring to the pad also allows control of the sliding forces and guidance of the pad, and hence the characteristics of the disk brake in terms of residual torque and absorption can be managed.

The brake pads are therefore stressed against the disk by an application element of the caliper, and repelled in the opposite direction towards their rest position by the friction of the disk when the application element has returned to its rest position. An example of these guideways amongst others is disclosed in document WO 2001/031223 A1.

However, sometimes the pad rubbing against the disk begins to vibrate, creating an unpleasant noise, despite the spring effect of the guideway.

SUMMARY

The object of the present disclosure is to propose an economic guideway which is able to offer an increased damping capacity in order to reduce the noise from vibration while guaranteeing good sliding of the pad, and a disk brake equipped with such guideways.

To this end, the disclosure concerns a guideway of the type defined by a body of substantially rectangular, U-shaped cross section in order to move in a housing and continuing into a front support surface which comes to rest against the front surface of a stud and carries two tabs to form lateral stops arising from either side of the stud, and a damper spring formed by a hairpin leg which returns to the front to rest elastically against the side of a pad above a lug, and by an inner front support surface which comes to rest against the inner surface of the arm and receives a face of the pad below the lug, the body having an outer radial surface which comes to rest against an upper face of the housing, followed by a base which comes to rest against the base of the housing, and an inner radial surface equipped with a locking tab to rest and hook against a lower surface of the housing.

The guide element according to the disclosure is perfectly fixed to the arm of the carrier both by its support on the stud and by its hooking by the locking tab in the housing of the arm. The U-shape of the body of the guide element offers a good guidance contact for the auxiliary or radial spring fitted to each lug of the pad, and not only supports the sensitivity of the braking movement but above all the release of the pad in relation to the disk surface at the end of braking in order to prevent any residual contact, which is the source of friction losses.

To resolve this problem, the object of the disclosure is a guideway for a disk brake of the type described above comprising elastic damping means on all faces of the guideway liable to be in contact with a carrier, and made from a metal sheet covered with said damping means on just one of its faces, characterized in that the damping face comprises contact zones with the carrier and the guideway, and that said guideway comprises an elastic leg in contact with the pad, and has a bent-over portion such that the damping face lies opposite a support zone on the pad. This bent-over portion of the elastic leg allows the material used as a damping means not to come into contact with the pad, and hence for the coefficient of friction between the pad and the guideway to be substantially constant over all contact zones between the pad and the guideway, the coefficient of friction between the pad and the damping material being generally higher than the coefficient of friction between the pad and the stainless steel sheet.

The contact zone of the elastic leg of the guideway has a rounded form to improve friction between the pad and said leg.

This rounded form advantageously has a radius of between 0.5 mm and 15 mm, and even more advantageously a radius of between 1 mm and 5 mm.

The elastic damping means are advantageously made from an elastomer material.

The elastic damping means are advantageously made from an elastomer material of a thickness between 0.3 mm and 1 mm.

Another advantageous characteristic is that the guideway is made preferably from a stainless steel sheet.

Another advantageous characteristic is that the metal part of the guideway is preferably made from a stainless steel sheet of thickness between 0.3 mm and 1 mm.

Another advantageous characteristic is that the guideway is fixed to the fixed carrier by elastic fixing means, by the nesting of complementary forms and two tabs located on either side of an elastic blade. These means ensure the positioning and support of the guideway on the carrier.

The object of the disclosure is also a brake disk of the type described above, equipped with at least one guideway in contact with the carrier, and made from a metal sheet covered by damping means on just one of its faces, characterized in that the damping face of the guideway comprises contact zones with the carrier and the guideway, and that said guideway comprises an elastic leg in contact with the pad and has a bent-over portion such that the damping face lies opposite a support zone on the pad.

BRIEF DESCRIPTION OF THE DRAWINGS

Other characteristics and advantages will appear from reading the detailed description below, for understanding of which reference is made to the attached drawings in which.

DETAILED DESCRIPTION

Figure 1:
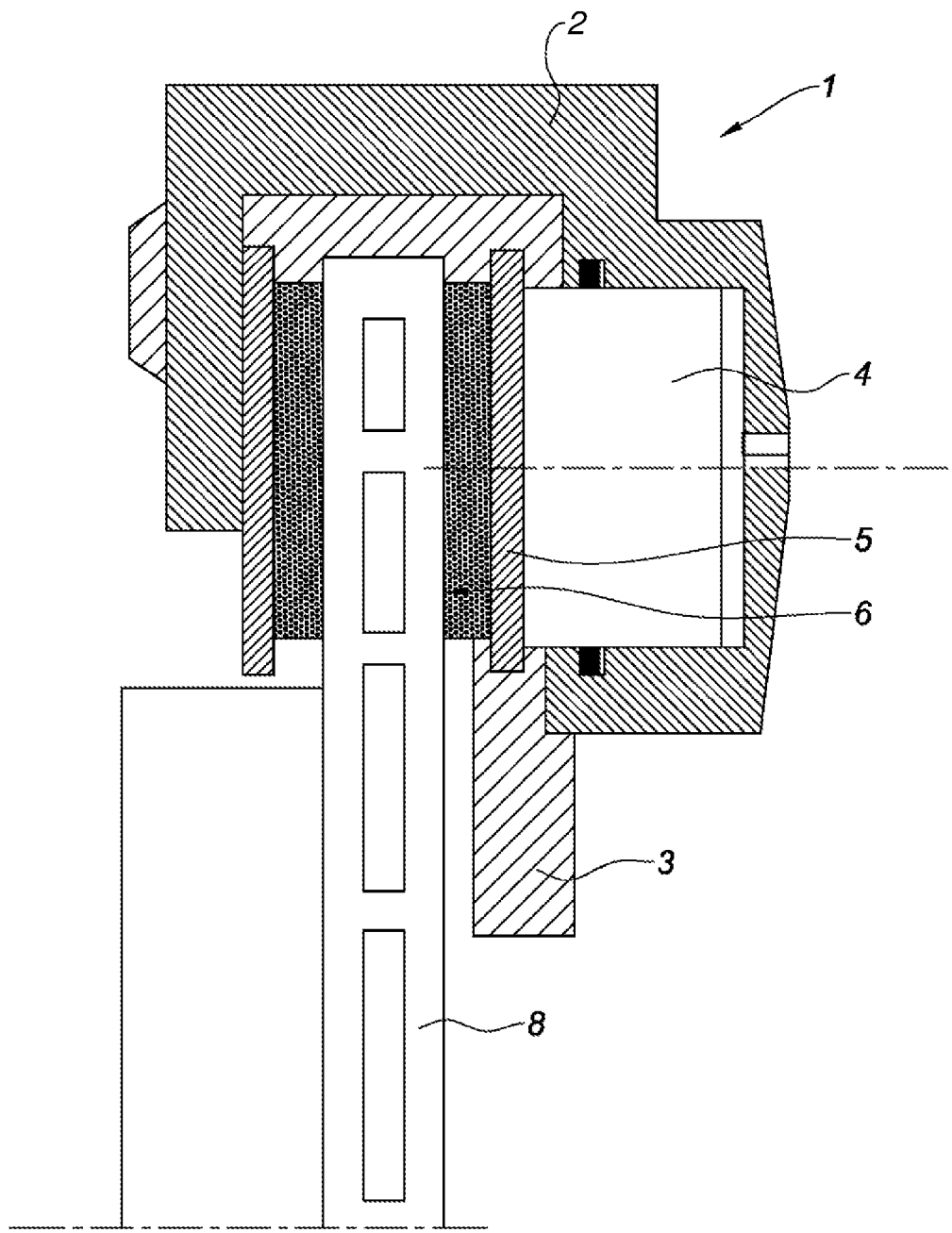
FIG. 1 is a cross-section view showing a brake disk according to the disclosure.
Figure 2:
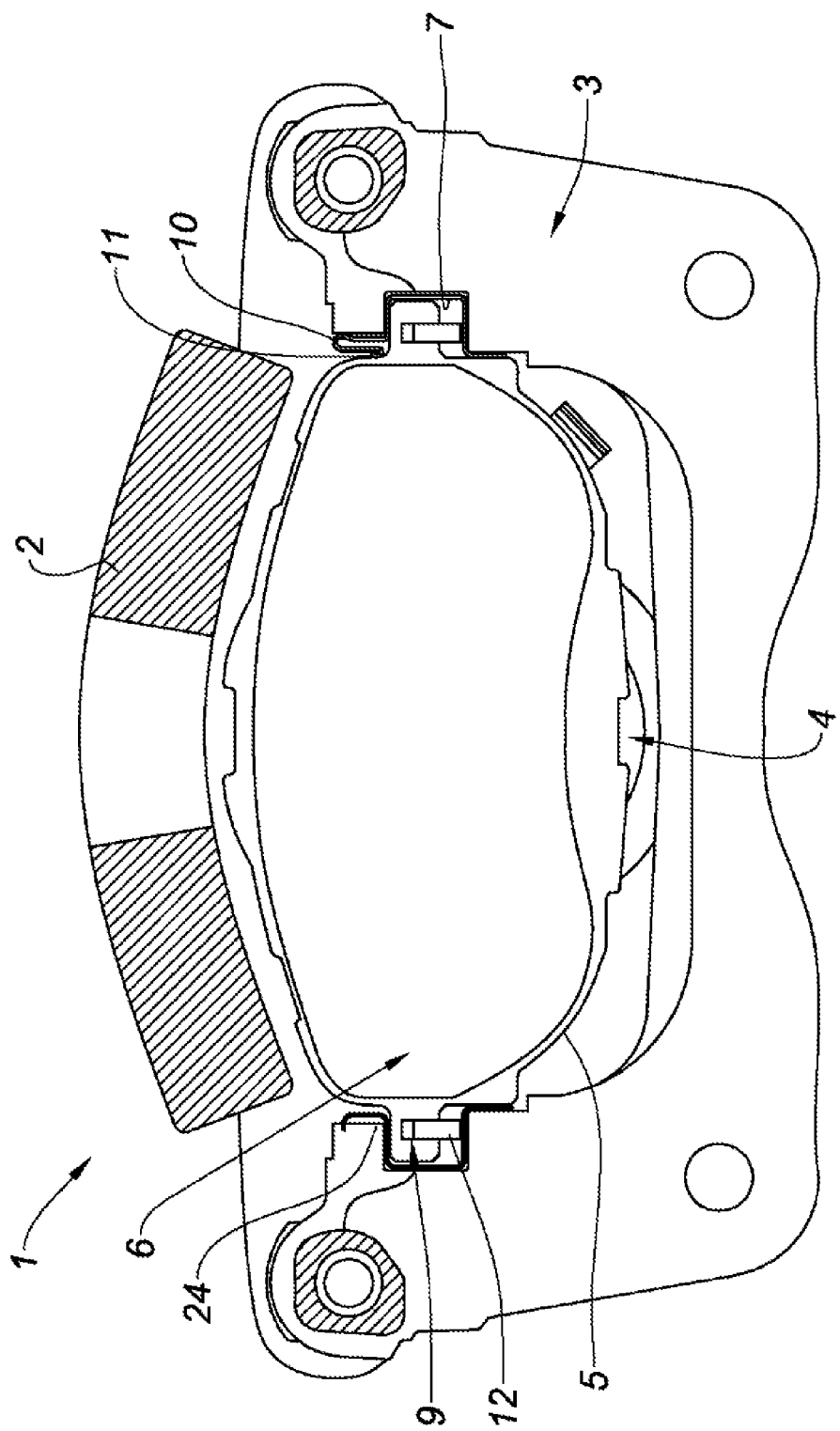
FIG. 2 is a cross-section view showing a brake disk according to the disclosure.
Figure 3:
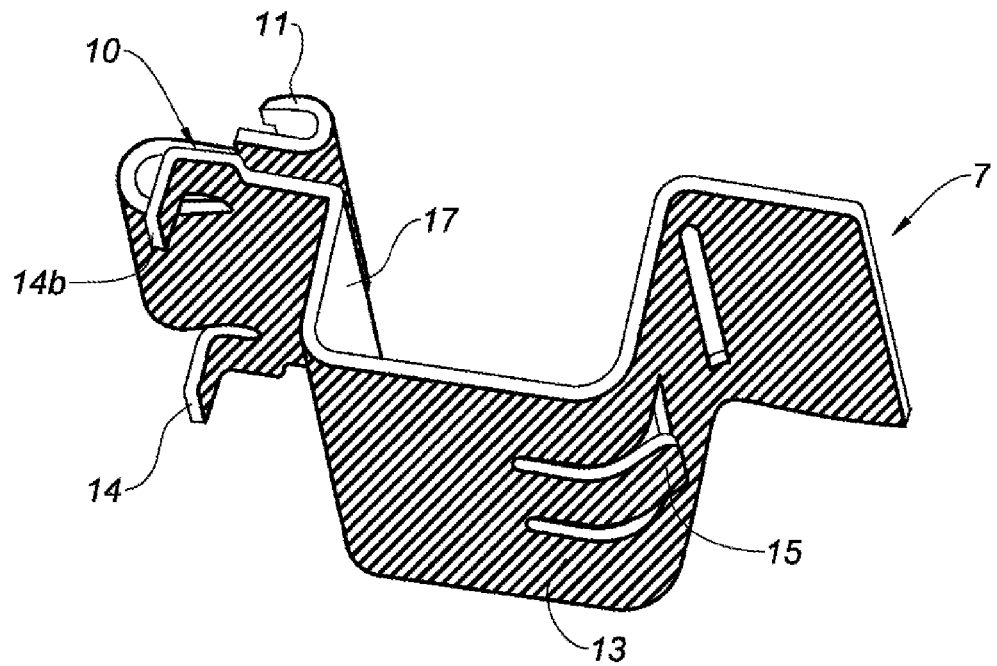
FIG. 3 is an isometric view of the guideway according to the disclosure.
Figure 4:
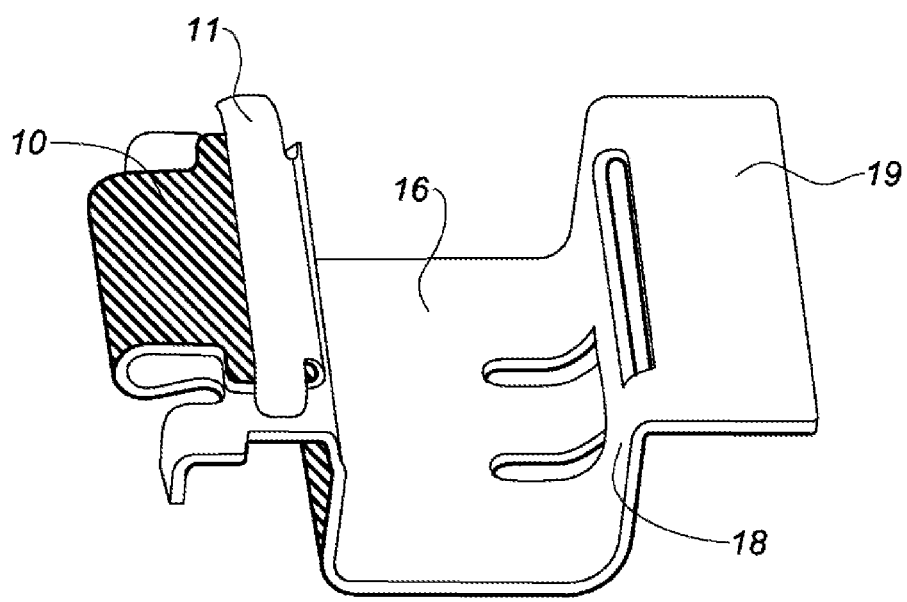
FIG. 4 is an isometric view of the guideway according to the disclosure along another axis.
Figure 5:
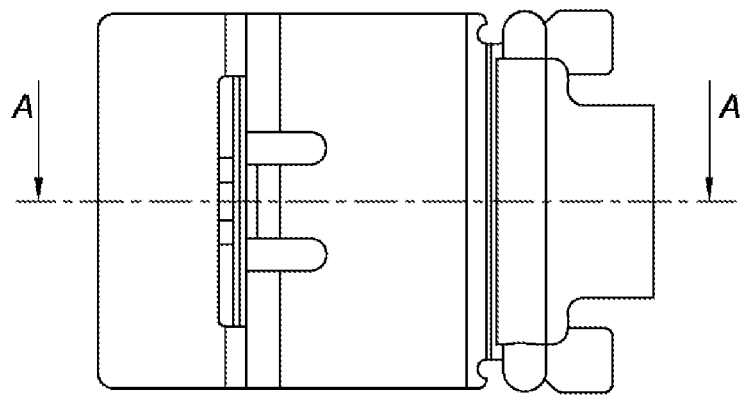
FIG. 5 is a view of the guideway according to the disclosure.
Figure 6:
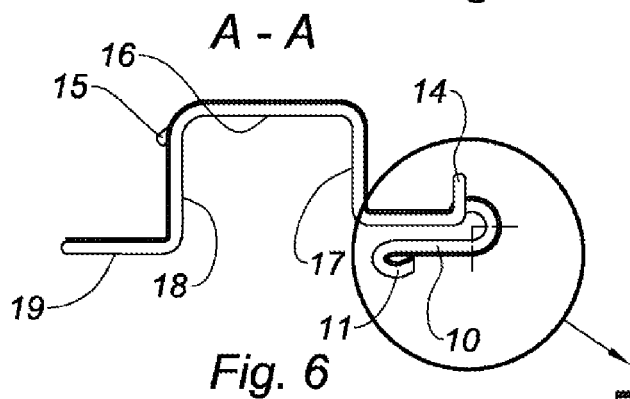
FIG. 6 is a cross-section view along line A-A of the guideway according to the disclosure along another axis.
Figure 7:
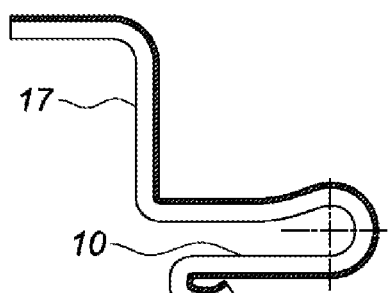
FIG. 7 is an enlarged view of the guideway shown in FIG. 6 according to the disclosure.
Figure 8:
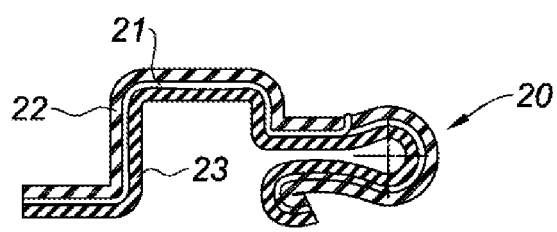
FIG. 8 is a view of the guideway according to the disclosure and according to another embodiment.

For economic reasons, these guideways are made by cutting and folding from a metal sheet covered by a damping means on just one face, forming two layers. The face carrying the damping means generally has a higher coefficient of friction than the face of the metal which is not covered. It is therefore important that all parts of the guideway in contact with the pad have the same coefficient of friction, so as to avoid creating a bias of the pad during its sliding in the release phase.

More particularly, the object of the disclosure is a guideway for a disk brake 1 of a motor vehicle, which comprises at least one brake pad 5 which is mounted sliding in at least one guideway 7 in relation to a brake disk 8 along an axially oriented slide axis, between a front braking position in which a friction face 6 of the brake pad 5 is able to be applied to a face of the disk 8, and a rear rest position in which the friction face of the brake disk is remote from the face of the disk. A caliper 2 comprises at least one application element 4 of the brake pad 5, which is able to stress the brake pad axially towards its braking position, and is of the type in which the guideway 7 is fixed to a fixed carrier 3.

This guideway of the type defined has a body of substantially rectangular, U-shaped cross section in order to move in the housing and continuing into a front support surface which comes to rest against a front surface of a stud 24 of the carrier 3, and carries two tabs 14 and 14b to form lateral stops arising from either side of the stud, and a damper spring 10 formed by a hairpin leg which returns to the front to rest elastically against the side of the pad 5 above the lug 9, and by an inner front support surface which comes to rest against the inner surface of the arm and receives a face of the pad below the lug, the body having an outer radial surface which comes to rest against an upper surface of the housing, followed by a base 16 which comes to rest against a base of the housing, and an inner radial surface equipped with a locking tab 15 to rest and hook against a lower surface of the housing, comprising the elastically deformable leg 10 and a bent-over portion serving as a guide face 11, comprising a contact zone with the brake pad 5 and exerting a constant elastic force F, and comprising elastic damping means 13 on all faces of the guideway liable to be in contact with the carrier 3, and made from a metal sheet covered by said damping means on just one of its faces, characterized in that the damping face comprises contact zones with the carrier 3 and the guideway 7, and that said guideway comprises the elastic leg 10 in contact with the pad, and has a bent-over portion 11 such that the face comprising the damping means 13 lies opposite a support zone on the pad 5.

The bent-over portion 11 forming the contact zone of the elastic leg 10 of the guideway 7 has a rounded form to improve the friction between the pad and said leg, and this rounded form 11 advantageously has a radius of curvature of between 0.5 mm and 15 mm, and further advantageously a radius of between 1 mm and 5 mm.

Effectively, this bent-over portion of the elastic leg allows the material used as a damping means not to come into contact with the pad, and hence the coefficient of friction between the pad and the guideway to be substantially constant over all contact zones between the pad and the guideway.

The damping face comprises elastic damping means which are advantageously made from elastomer material.

According to another embodiment, the guideway 20 is made from metal sheet which is coated, cut and folded, wherein the layers 22, 21, 23 may be made from different materials, for example polytetrafluoro-ethylene/metal/rubber. This allows adjustment of the damping capacities and friction of the guideway as a function of the application on vehicles. Effectively these guideways have an effect on the sliding forces of the pad, and because the coefficient of friction between the guideway and the pad can be increased or reduced, the residual torque of the disk brake can be reduced.

The contact zone 11 of the elastic leg 10 of the guideway 7 has a rounded form in order to improve the friction between the pad and said leg.

This rounded form advantageously has a radius of curvature of between 0.5 mm and 15 mm, and further advantageously a radius of between 1 mm and 5 mm.

Another advantageous characteristic is that the guideway 7 is fixed to the fixed carrier 3 by elastic fixing means 15, by nesting of complementary forms and two tabs 14 and 14b situated on either side of an elastic blade 10.

REFERENCES OF MAIN ELEMENTS

1 Disk brake
2 Caliper
3 Carrier
4 Application element
5 Brake pad
6 Pad surface
7 Guideway
8 Disk
9 Pad lug
10 Deformable leg/spring
11 Guide face
12 Spring of the pad lug
13 Damping means
14 Fixing tab
14*b* Fixing tab
15 Tab of elastic fixing means
16 Bottom face of guideway
17 Side face of guideway
18 Side face of guideway
19 Contact face of guideway to pad
20 Guideway according to another embodiment
21 Metal layer
22 Material layer
23 Material layer
24 Carrier stud

The invention claimed is:

1. A guideway for a disk brake comprising:
a body having a substantially U-shaped cross section that is configured to be received in a housing, the body including:
   a base portion configured to rest against a base of the housing, the base portion including a first end region and a second end region;
   an inner radial portion extending from the first end region of the base, the inner radial portion including a locking tab configured to rest and hook against a lower surface of the housing;
   an inner front portion extending from the inner radial portion and configured to be interposed between and in contact with the housing and a disk brake pad;
   an outer radial portion extending from the first end region of the base portion and configured to rest against a lower surface of a stud of the housing;
   a front support portion extending from the outer radial portion and including a front support surface configured to rest against a front surface of the stud, the front support portion including two tabs configured to extend from either side of the stud so as to form a lateral stop for the guideway; and
   a damper spring portion formed by a first hairpin leg extending from the front support portion and turning approximately 180 degrees, a damper spring leg extending from the first hairpin leg generally parallel to the front support portion, and a bent over portion including a guide face defining a contact zone configured to rest elastically against a side of a disk brake pad above a lug of the disk brake pad to exert a constant elastic force on the disk brake pad;
wherein faces of the guideway configured to contact the housing form a damping face and include an elastic damping element;
wherein the guideway is formed from a metal sheet covered with said elastic damping element on just one face of the metal sheet;
wherein the bent over portion is configured to contact the disk brake pad at a side of the metal sheet opposite the elastic damping element.

2. The guideway for a disk brake as claimed in claim 1, wherein the elastic damping element includes an elastomer material.

3. The guideway for a disk brake as claimed in claim 1, wherein the elastic damping element includes an elastomer material of a thickness between 0.3 mm and 1 mm.

4. The guideway for a disk brake as claimed in claim 1, wherein:
the bent-over portion forming the contact zone of the damper spring portion of the guideway has a rounded shape configured to improve friction between the disk brake pad and the damper spring portion; and
the rounded shape has a radius of between 0.5 mm and 15 mm.

5. The guideway for a disk brake as claimed in claim 1, wherein the metal sheet of the guideway is a stainless steel sheet of thickness between 0.3 mm and 1 mm.

6. The guideway for a disk brake as claimed in claim 1:
wherein the guideway is formed from three layers;
wherein a middle layer of the three layers is formed from a material that is different from materials of outer layers of the three layers; and
wherein the material of the middle layer is metallic.

7. The guideway for a disk brake as claimed in claim 1, wherein the front support portion and the damper spring portion are arranged in such a way that a line perpendicular to the disk brake pad at the contact zone passes through the bent over portion, the damper spring leg, and the front support portion.

8. A disk brake system comprising:
a housing including a stud having a front surface and a stud lower surface, a base, and a lower housing surface, the stud lower surface, the base, and the lower housing surface defining a lug recess
a brake pad having a lug extending from a lateral side of the brake pad, the lug configured to be positioned in the lug recess below the stud; and
a guideway including:
   a body having a substantially U-shaped cross section configured to be received between the brake pad and the housing, the body comprising:
   a base portion resting against the base of the housing, the base portion including a first end region and a second end region;
   an inner radial portion extending from the first end region of the base portion, the inner radial portion including a locking tab configured to rest and hook against the lower housing surface;
   an inner front portion extending from the inner radial portion, the inner radial portion being interposed between and in contact with the housing and the brake pad;
   an outer radial portion extending from the first end region of the base portion and resting against the stud lower surface;
   a front support portion extending from the outer radial portion and including a front support surface resting against the front surface of the stud, the front support portion including two tabs configured to extend at either side of the stud so as to form a lateral stop for the guideway; and
   a damper spring portion formed by a first hairpin leg extending from the front support portion and turning approximately 180 degrees, a damper spring leg extending from the first hairpin leg generally parallel to the front support portion, and a bent over portion including a guide face defining a contact zone configured to rest elastically against the lateral side of the brake pad above the lug to exert a constant elastic force on the brake pad;

wherein faces of the guideway contacting the housing form a damping face and include an elastic damping element;

wherein the guideway is formed from a metal sheet covered with said elastic damping element on just one face of the metal sheet;

wherein the bent over portion is configured to contact the disk brake pad at a side of the metal sheet opposite the elastic damping element.

9. The disk brake system of claim 8, wherein the front support portion and the damper spring portion are arranged in such a way that a line perpendicular to the brake pad at the contact zone passes through the bent over portion, the damper spring leg, and the front support portion.

\* \* \* \* \*